C. E. STEERE.
EMBOSSING MACHINE.
APPLICATION FILED MAR. 19, 1920.

1,407,492.

Patented Feb. 21, 1922.
8 SHEETS—SHEET 3.

Inventor
Clarence E. Steere
Jones, Addington, Ames & Seibold  Attys.

C. E. STEERE.
EMBOSSING MACHINE.
APPLICATION FILED MAR. 19, 1920.
1,407,492.
Patented Feb. 21, 1922.
8 SHEETS—SHEET 4.
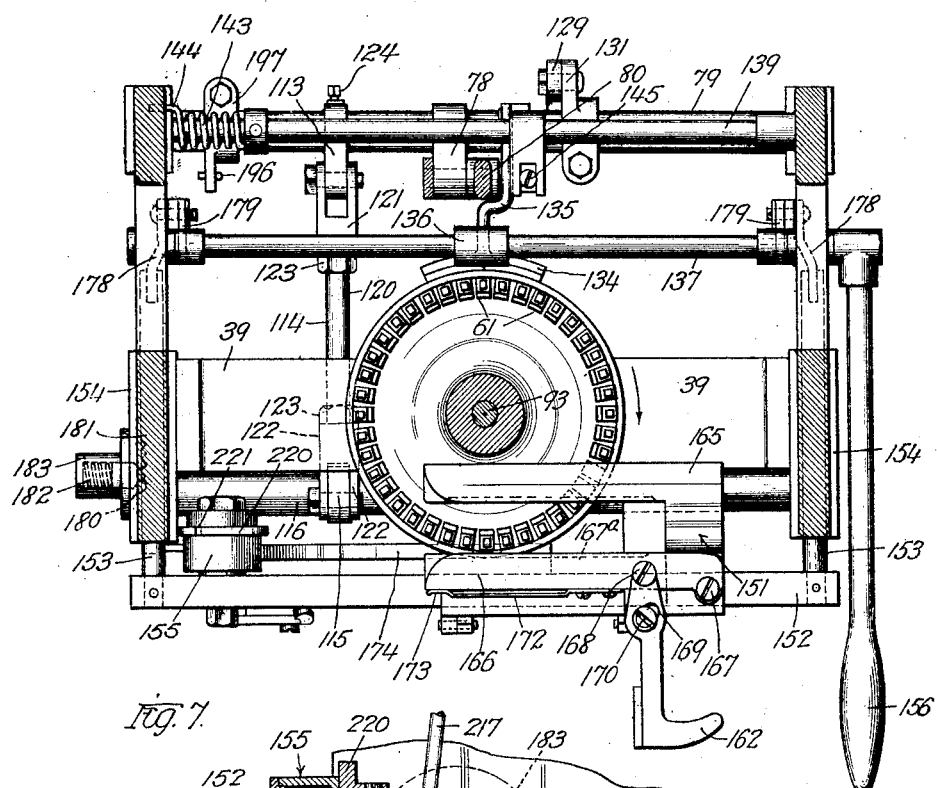
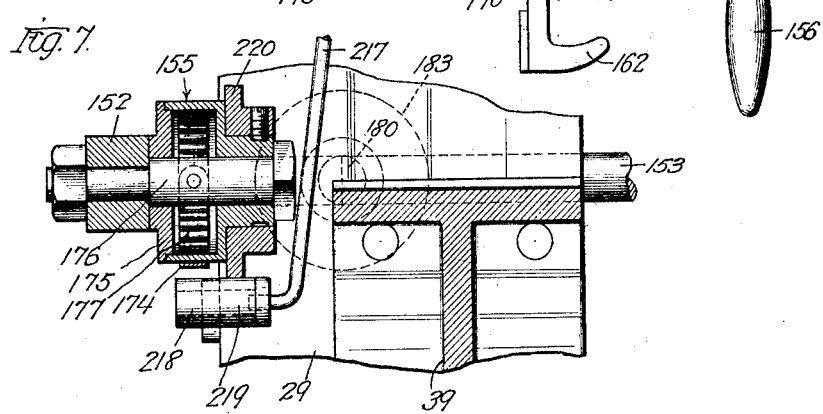
Inventor
Clarence E. Steere
Jones, Addington, Ames & Seibold Att'ys

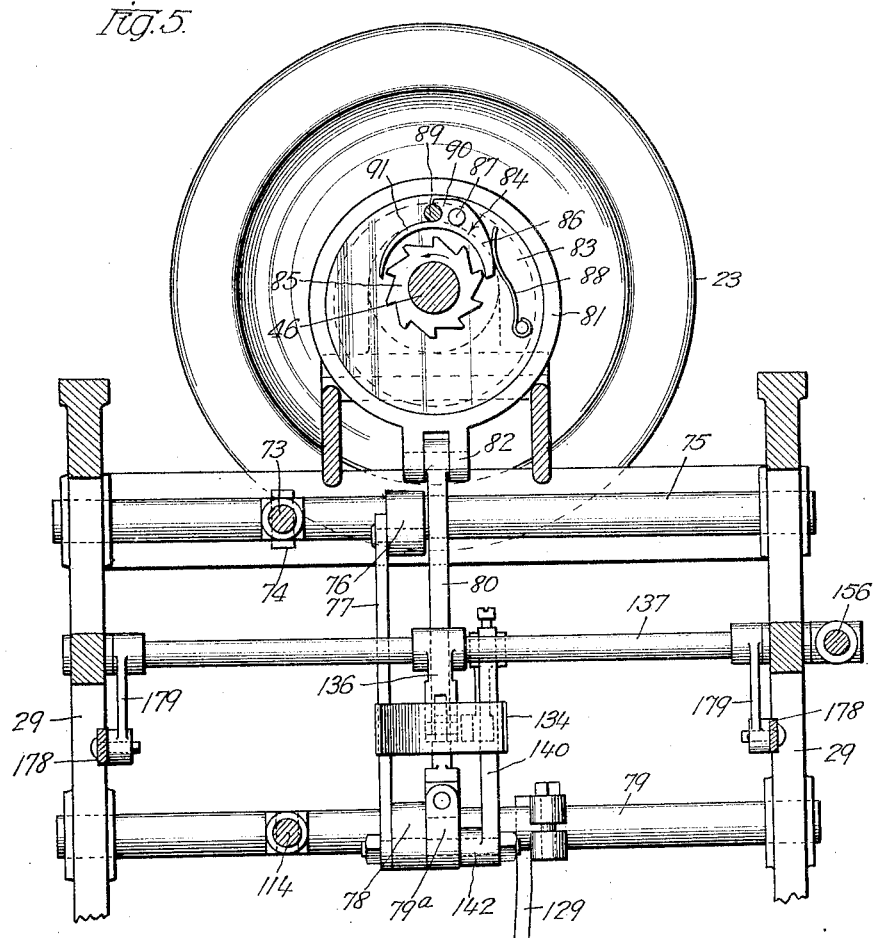
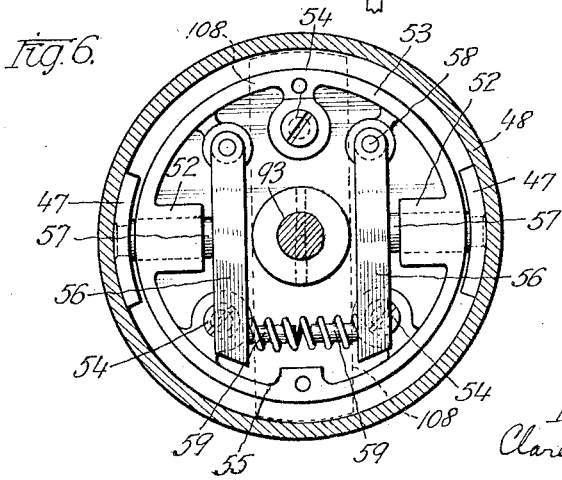

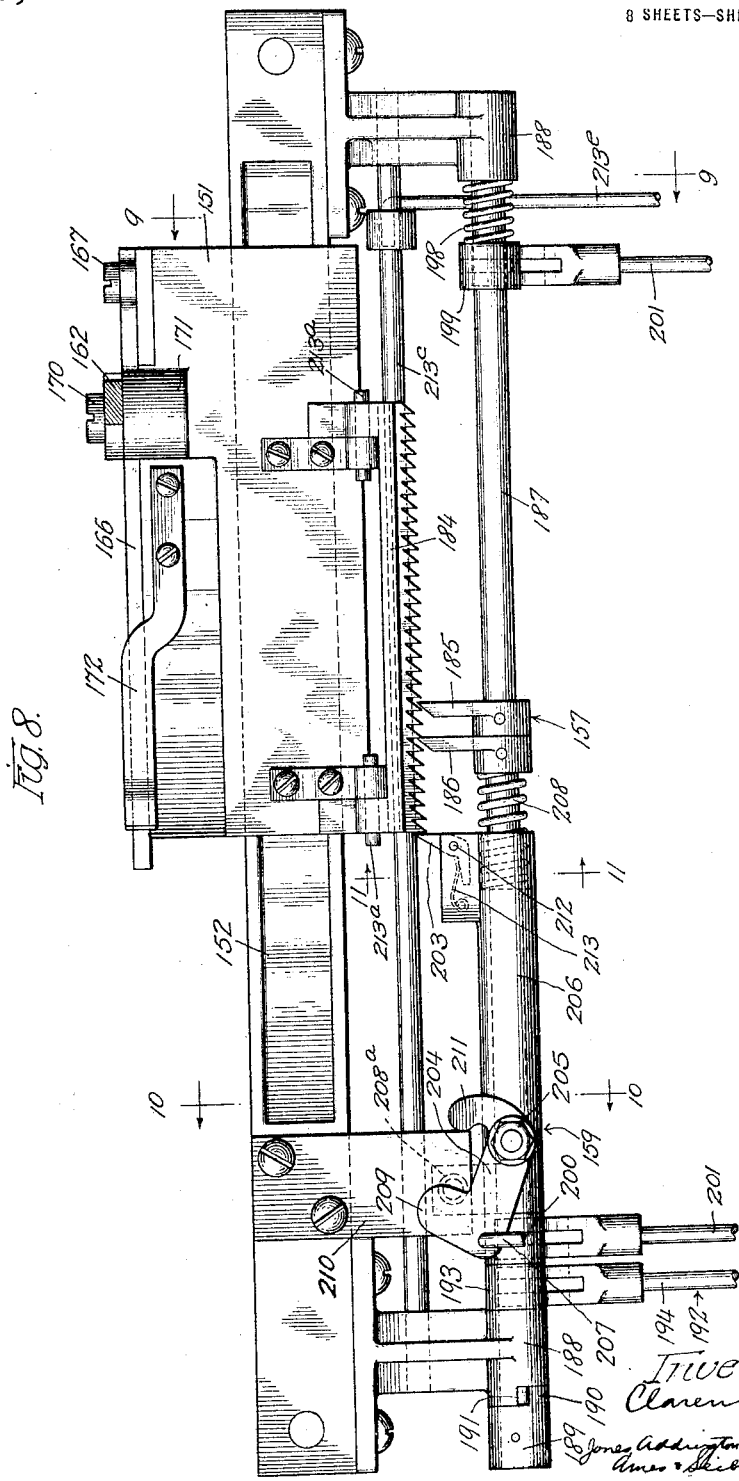

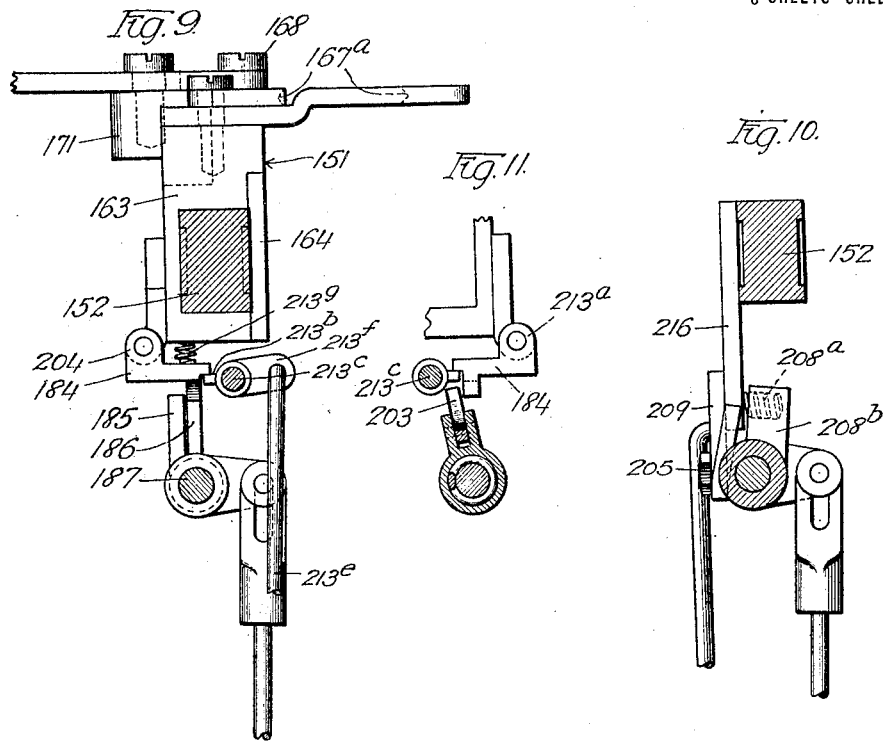
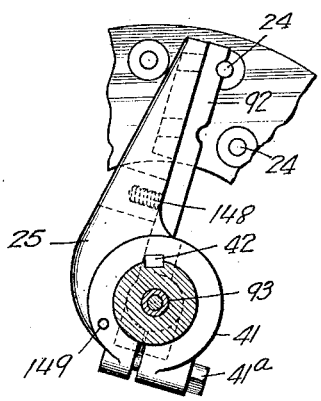
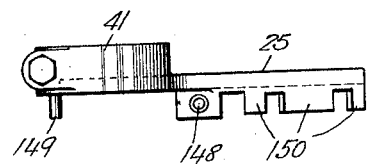

UNITED STATES PATENT OFFICE.

CLARENCE E. STEERE, OF CHICAGO, ILLINOIS, ASSIGNOR TO THE SPEEDAUMATIC COMPANY, OF CHICAGO, ILLINOIS, A CORPORATION OF DELAWARE.

EMBOSSING MACHINE.

1,407,492.   Specification of Letters Patent.   Patented Feb. 21, 1922.

Application filed March 19, 1920. Serial No. 367,121.

*To all whom it may concern:*

Be it known that I, CLARENCE E. STEERE, a citizen of the United States, residing at Chicago, in the county of Cook and State of Illinois, have invented new and useful Improvements in Embossing Machines, of which the following is a full, clear, concise, and exact description, reference being had to the accompanying drawing, forming a part of this specification.

My invention relates to machines for embossing metal, and more specifically to key-board typographs.

One of the objects of my invention is to provide such a machine which will be simple in construction, cheap to manufacture and durable and efficient in use.

Further objects will appear from the detailed description to follow and from the appended claims.

In the drawings in which an embodiment of my invention is shown:

Fig. 4 is a horizontal section on the line 4—4 of Fig. 1;

Fig. 5 is a section on the line 5—5 of Fig. 2;

Fig. 6 is a section on the line 6—6 of Fig. 2;

Fig. 7 is a section on the line 7—7 of Fig. 1;

Fig. 8 is a detail elevational view showing the carriage feed;

Fig. 9 is a section on the line 9—9 of Fig. 8;

Fig. 10 is a section on the line 10—10 of Fig. 8;

Fig. 11 is a section on the line 11—11 of Fig. 8;

Fig. 12 is a detail sectional view on the line 12—12 of Fig. 2 showing the flying stop-lever;

Fig. 13 is a side elevation of the flying stop-lever;

Fig. 14 is a detail plan view of a cam member;

Fig. 15 is a side elevation of the cam member shown in Fig. 14;

In order to give a general idea of the construction shown, I will first outline broadly the construction. The machine shown is operated somewhat similarly to the ordinary typewriter, being provided with a key-board similar to the key-board of the ordinary typewriter, having the usual typographical characters, and having a spacer bar which when actuated allows the carriage to advance a space without causing any character to be embossed, a release key for allowing the carriage to move freely without being controlled by the step key mechanism and a back space lever, for moving the carriage which carries the blank backwards.

A sliding carriage is provided which carries the metal blank to be embossed, which carriage is provided with a step feed mechanism, which automatically causes the carriage to advance one step each time a character is embossed. The machine is provided with a flying-die-carrying wheel, and flying lever, which travel together, which wheel and lever are selectively controlled by means of the keys, to stop the die-carrying wheel in the desired position, to bring the desired dies into operative relation with respect to the blank to be embossed. The die-carrying wheel is provided with two sets of dies, an upper set and a lower set, one of which travels above the blank to be embossed, and the other of which travels below the blank to be embossed. When the character is to be embossed, the corresponding upper and lower dies move toward each other, until they engage the blank, and between them emboss the desired character.

Figure 3:
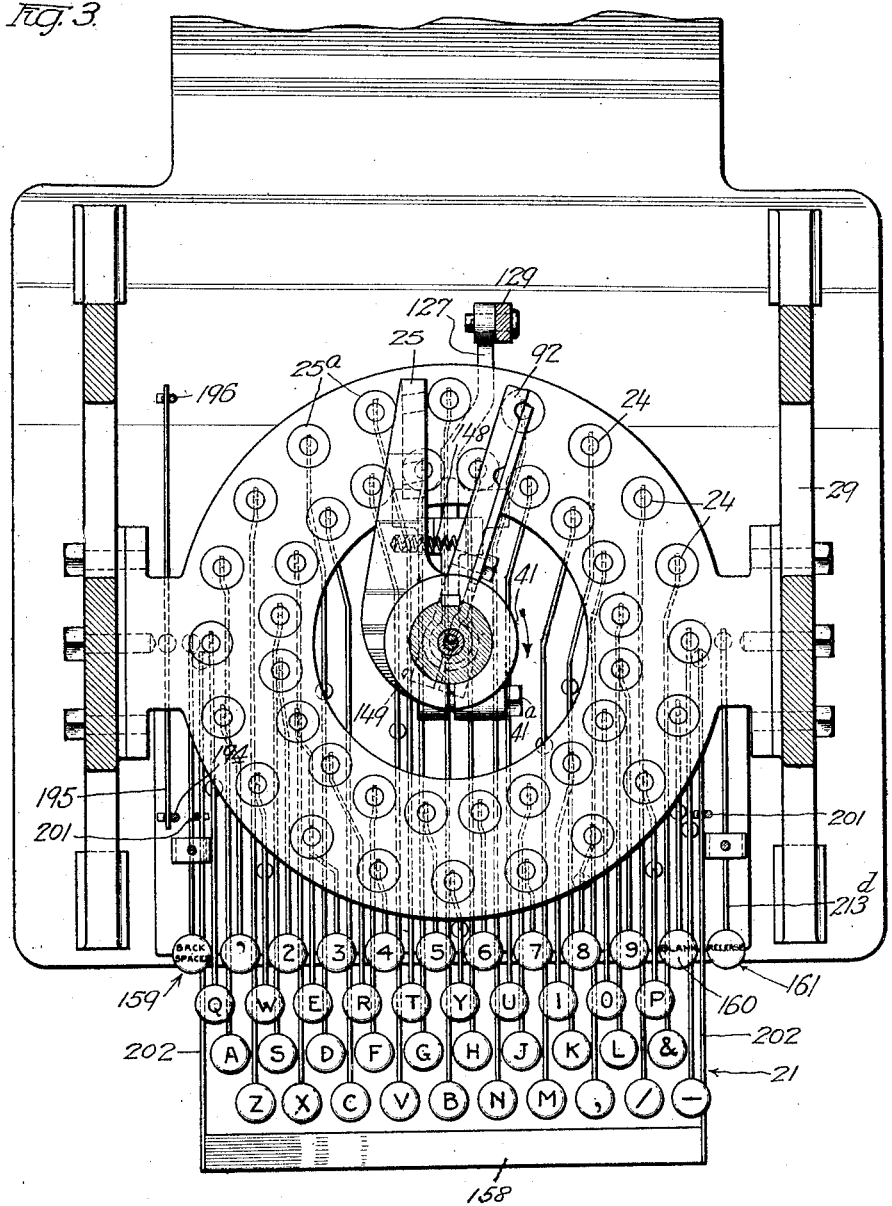
Fig. 3 is a horizontal section on the line 3—3 of Fig. 1.

Referring now to the construction in detail, the construction shown comprises a main frame 20, a set of keys 21, mounted on the main frame, a die-carrying wheel 22, frictionally driven from the drive-pulley 23, a set of stop-pins 24, arranged in two concentric circles as shown in Fig. 3, and actuated by the keys 21, a flying stop-lever 25, secured to rotate with the die-carrying wheel 22, a die-operating mechanism 26, and mechanism 27 controlled by the keys 21 for automatically causing the die-operating mechanism to operate.

The frame 20 comprises a base plate 28, and two side frames or standards 29, between which a greater part of the mechanism is mounted. The set of keys 21 are mounted on fulcrum-pins 30, mounted on a fulcrum-plate 31 which is secured to the base plate 28. The rear ends of the keys 21 are located so as to engage the bottom ends of the stop-pins 24, so that when the keys 21 are depressed, the stop-pins 24 are raised, to bring their upper ends above the upper surface of the stop-pin block 25ª into the path of the flying-levers. The stop-pins 24 are automatically returned after they have been raised by means of coil compression springs 32, which are mounted in the stop-pin block 25ª. Each stop-pin 24 is provided with a stop 33, which rests on a stop-plate 34 to limit the downward movement of the stop-pins under the action of the springs 32.

The flying die-carrying wheel 22 has upper and lower wheel portions 35 and 36, both of which are formed integral with the journal portion 37, which is mounted in a bearing 38 in the cross bracket 39 which extends between the side frames or standards 29 and is secured thereto. The hub portion of the flying die-carrying wheel 22 extends clear through the bearing 38 and beyond on the lower side, and has secured to its lower end the flying stop-arm or lever 25, which is controlled by the stop-pins 24 to bring the die-carrying wheel to a stop at the desired position. This flying arm 25 is secured to the hub portion 37 by means of a split collar 41 formed integral with the flying arm and clamped onto the extension of the journal portion 37 by means of a clamping screw 41ª. The flying arm 25 is definitely positioned and held from relative rotation with respect to the journal 37 by means of a key 42.

The transmission between the drive pulley 23, and the flying die-carrying wheel 22 comprises a friction drive device or mechanism 43, a bevel gear 44, secured to the friction drive mechanism 43, a bevel gear 45, driving the bevel gear 44, and a shaft 46, to which the bevel gear 45 is secured, and to which the drive pulley 23 also is secured.

Figure 16:
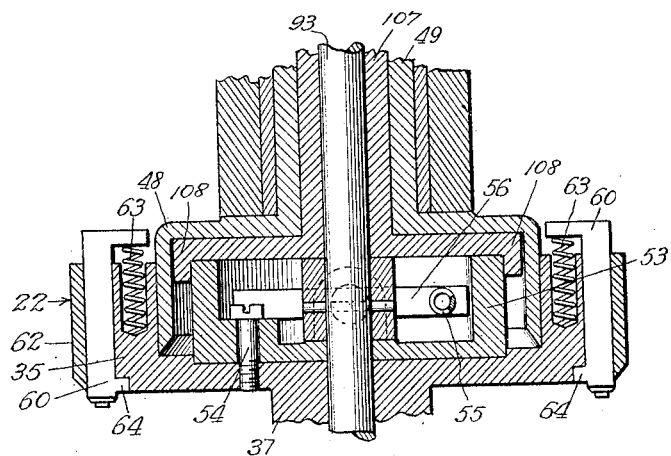
Fig. 16 is a fragmentary axial sectional view on line 16—16 of Fig. 2.

The friction drive mechanism (see particularly Figs. 2, 6 and 16) comprises a pair of spring pressed friction shoes 47, which bear outwardly against the inner surface of a friction drum 48, which friction drum 48 has a hub or journal portion 49 extending upwardly therefrom, to the upper end of which is secured the bevel gear 44, and which journal portion is mounted in a bearing 50 on the upper cross bracket 51, which extends between and is secured to the side frames of the bracket 20.

The friction shoes 47 are slidably mounted in guides 52 in a circular dish-shaped frame 53, which is secured to the die-carrying wheel 22 by means of three screws 54. The friction shoes 47 are pressed outwardly into engagement with the friction drum 48 by means of a coil compression spring 55, the ends of which bear on levers 56, which levers in turn bear on the pins 57, which are slidably mounted in the guides 52, and are secured to the friction shoes 47. The levers 56 are pivoted at 58 to the support 53. The compression spring is held in place with respect to the levers 56, by means of pins 59, secured to levers 56 and extending inside the spring.

The die-carrying wheel 35 carries the dies proper 60, while the lower-die-carrying wheel carries the matrices 61. Each die 60 is slidable in a slot in the periphery of the wheel portion 35, all of the dies 60 being held in place in these slots by means of a retaining ring 62, which retaining ring is slipped on over the wheel portion 35 after the dies 60 are in position in their respective slots. The dies 60 are normally held in retracted position by means of compression springs 63, seated in recesses in the wheel portion 35. Each die is provided with a stop portion 64 to limit its retracting movement. Similarly each of the matrices 61 is mounted in a slot in the wheel portion 36 and is held in place by means of a retaining ring 65, the matrices being held in retracted position by means of coil compression springs 66 seated in recesses in the wheel portion 36.

A ball thrust bearing 67 may be provided underneath the wheel portion 36.

The mechanism for actuating the dies 60 comprises a plunger 68, located in position to engage the upper end of one of the dies 60, a rock-arm 70 which bears on the upper end of the plunger 68, a rock-shaft 71, to which the rock-arm 70 is secured, a rock-arm 72 also secured to the rock-shaft 71 (see Fig. 1) an adjustable link 73 pivoted at one end to the rock-arm 72, a rock-arm 74 to which the other end of the adjustable link 73 is secured, a rock-shaft 75 to which the rock-arm 74 is secured, a rock-arm 76 also secured to the rock-shaft 75, a link 77 (see particularly Fig. 5) pivotally connected at one end to the rock-arm 76, a rock-arm 78 to which the other end of the link 77 is pivotally connected, a rock-shaft 79 to which the rock-arm 78 is secured, a universal joint 79ª pivotally connected with the rock-arm 78, a connecting rod 80 pivotally connected with the universal joint 79ª, an eccentric strap 81 pivotally connected at 82 with the connecting rod 80, an eccentric 83 for operating the eccentric strap 81, and a clutch mechanism 84 for connecting and disconnecting the eccentric with respect to the drive shaft 46.

The universal joint connection 79ª between the rock-arm 78 and the connecting rod 80 is necessary because of the fact that the rock-arm 78 has an oscillating movement with respect to the rock-shaft 79, and the connecting rod 80 has an oscillating movement due to its connection with the eccentric strap 81.

The clutch mechanism 84 which controls the connection of the eccentric 83 with the drive shaft 46 comprises a ratchet 85, which may be formed integral with the drive shaft 46, a pawl 86 pivoted at 87 to the eccentric 83, a leaf-spring 88, the tendency of which is to hold the pawl 86 in engagement with the teeth of the ratchet 85, and a pin 89 slidably mounted to move into and out of the path of the pawl 86.

Automatic means as well as manual means are provided for controlling this sliding pin 89, as will be hereinafter described in detail. When the pin 89 is moved out of engagement with the stop portion 90 of the pawl 86, the spring 88 throws the pawl into engagement with the ratchet 85, which is rotating with the drive shaft 46. This engagement causes the eccentric 83 to rotate with the drive shaft 46 for a complete revolution. The rotation of the eccentric 83 is limited to one revolution by means of the pin 89 which is automatically returned to a position in which it will be engaged by the arcuate cam portion 91 of the pawl 86, this cam portion 91 traveling underneath the pin 89 and causing the point of the pawl to be lifted out of engagement from the teeth of the ratchet 85, the shoulder portion 90 of the pawl coming up against the pin 89 to definitely stop the rotation of the eccentric 83, simultaneously with the disengagement of the pawl and ratchet.

I will now describe the mechanism for automatically controlling the sliding pin 89, before giving a description of the connections for actuating the lower dies or matrices 61. This mechanism is constructed so that when a key is depressed to stop the flying type wheel 35 in the desired position, the eccentric 83 will automatically be given a single revolution to cause the actuation of the selected pair of the dies 60 and matrices 61 to form the desired impression on the sheet metal blank. This mechanism comprises a flying arm or lever 92, (see particularly Figs. 2 and 12) which rotate above the stop-pin block 25ª, in position to be engaged by the stop pins, when they are elevated by depressing the keys, a central shaft 93, onto which the flying arm 92 is clamped, a cam member 94 secured to the upper end of the shaft 93, a second cam member 95, which is caused to rise by the cam member 94 when the flying arm 92 is brought to rest by one of the stop-pins, a pivot block 96, having a swivel connection with the cam member 95, a link 97 having a pivotal connection at 98 with the pivot block 96, and a bell crank lever 98 pivotally mounted at 99 on the bracket 100, and having a pivotal connection at 101 with the sliding pin 89, and having a shorter arm engaging at 102 with a shoulder on the link 97. A coil tension spring 103 is provided for returning the sliding pin 89, this spring being connected at one end with the bracket 100 and at the other end with the bell crank lever 98. A coil tension spring 104 is provided for holding the pivoted link 97 over against the bell crank lever 98, one end of this spring being connected with the bell crank lever and the other to the pivoted link 97.

When the cam member 95 is lifted by the cam member 94 it raises the pivoted link 97 also. This actuates the bell crank lever 98, because of the engagement of the shoulder on the link 97 with the bell crank at 102, and withdraws the sliding pin 89 from engagement with the pawl 86, permitting the pawl 86 to engage the ratchet 85 to cause the eccentric 83 to rotate, thus causing the selected die 60 and matrix 61 to operate to impress the desired character on the blank.

In order that the embossing operation may not be "repeated" as the drive shaft 46 continues to revolve, means are provided for releasing the sliding pin 89, to permit it to return under the action of the spring 103 into position to be engaged by the shoulder portion 90 of the pawl 86 to disconnect the pawl 86 from engagement with the driving ratchet wheel 85. This release is effected by the engagement of a projection 105 on the pin 89 engaging the pivoted link 97 to push the link 97 away to cause the shoulder to disengage from the bell crank lever 98 at 102. When this disengagement is effected the sliding pin 89 is returned by means of the coil tension spring 103. Thus the embossing operation is prevented from being repeated as the drive shaft 46 continues to revolve.

Figure 17:
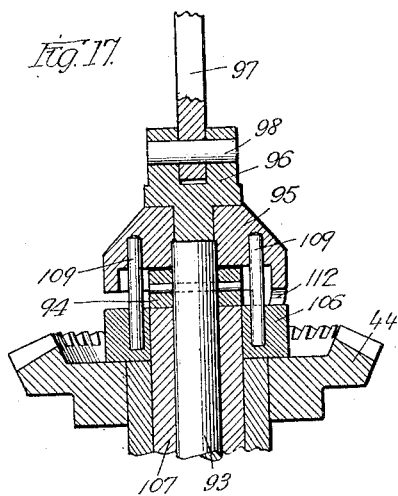
Fig. 17 is also a fragmentary axial sectional view on line 17—17 of Fig. 2 showing details of construction.

I will now describe more in detail the two cam members 94 and 95. The cam member 95 is provided with means whereby it rotates with the die-carrying wheel 22. This connection between the cam member 95 and the die-carrying wheel is effected through a collar 106, with respect to which the cam member 95 is slidably but non-rotatably connected, and a sleeve 107, to which the collar 106 is secured, which sleeve is provided at its lower end with a pair of arms 108, (see Fig. 16) which arms are secured to the cup-shaped member 53, so that the collar 106 turns with the member 53 and hence with the die-carrying wheel 22. The connection between the collar 106 and the upper cam member 95 is by means of a pair of pins 109 (Fig. 17) secured in the collar 106 and extending upwardly past the lower cam member 94 into a pair of holes in the upper cam member 95, whereby the upper cam member can rise under the action of the lower cam member 94 but must rotate along with the collar 106, and hence along with the die-carrying wheel 22. As previously described the lower cam member 94 is secured to the shaft 93, to which the flying arm 92 is secured. This cam member 94 is provided with a pair of wings 110 (Fig. 14) each having an inclined surface 111, which cooperates with a corresponding inclined surface on the downwardly extending lugs 112 (Figs. 15 and 17) of the upper cam member 95.

When the flying arm 92 is stopped by engagement with one of the stop-pins, as the upper cam member 95 continues to rotate due to its connection with the die-carrying wheel 22, the lugs 112 will ride up on the wings 110 of the lower cam member, due to the engagement of the inclined surfaces. This will cause the upper cam member to be raised, and will lift the pivoted link 97 to cause the eccentric 83 to rotate with the drive shaft 46 as previously described.

Shortly after the flying arm 92 is brought to rest, the die-carrying wheel itself will also be brought to rest, due to the front face of the flying lever 25 engaging the rear face of the flying lever 92. The timing of the parts is such that the stopping of the flying arm 92 will not cause the operation of the die and matrix until the flying arm 25, and hence the die-carrying wheel itself has been brought to a stop.

The fact that the flying lever 25 travels a short distance after the flying lever 92 has been brought to a stop, will effect a relative movement between the cam members 94 and 95 sufficient to cause the cam member 95 to be elevated to put the die-actuating mechanism in operation.

I have not yet described in detail the transmission mechanism for operating the lower set of dies or matrices, as this transmission is quite similar to the transmission for the upper set of dies. This transmission for the actuation of the matrices comprises (in addition to the eccentric 83, the eccentric stop 81, the connecting rod 80, the universal joint 79ª, the rock-arm 78, and the rock shaft 79) a rock-arm 113, secured to the rock-shaft 79, an adjustable link 114, having one end pivotally connected with the rock-arm 113, a rock-arm 115 to which the other end of the adjustable link 114 is secured (Fig. 4), a rock-shaft 116 on which the rock-arm 115 is secured, a rocking arm or cam 117 also secured to the rock-shaft 116 and a sliding pin or plunger 118 on the end of which the rock-arm 117 bears. A coil compression spring 119 is provided for returning the plunger 118 after it has been actuated by the rock-arm 117.

The construction of the transmission between the eccentric and the upper and lower dies, is such that on each revolution of the eccentric the selected die and matrix will be moved toward each other and again retracted, so that the desired impression can be made on the blank.

As previously stated, both the link 73 and the link 114 are made adjustable, this adjustment being in length, so that the effective length of both of these links can be changed. By means of this adjustment in the length of these links, the pressure of the dies and matrices on the blank may be regulated, as lengthening these links would cause the dies and matrices to approach each other more closely and thus make a more forcible impression on the blank, and shortening the links would cause the dies and matrices to approach each other less closely and produce a less forceful impression on the blank.

If desired the rock-arms 74 and 113 may also be made adjustable about their respective rock-shafts. This adjustment of the rock-arms 74 and 113 together with the adjustment of the links 73 and 114 previously referred to, enables the throw of the dies and matrices to be changed, that is, the length of travel of these dies and matrices. With the adjustment shown in Fig. 2 a very forceful actuation of the dies and matrices is obtained, as the adjustment is such that the rock-arms 74 and 113 will travel a considerably greater distance than the rock-arms or cams 70 and 117. If the adjustment were changed, however, so that the rock-arms 74 and 113 extended substantially directly upwardly (the adjustable links 73 and 114 being suitably lengthened to permit this adjustment) the movement of the rock-arms or cams 70 and 117 would be substantially the same as the movement of the rock-arms 74 and 113, giving a less forceful actuation of the dies and matrices, than with the adjustment previously described. The adjustment of the link 114 may be effected by having the rod portion 120 threaded into the yoke portions 121 and 122, the threads being right and left-handed respectively, to form a turn buckle construction, the parts being held in adjusted position by means of lock-nuts 123. The link 73 may be made similarly adjustable. The rock-arms 74 and 113 may be held in their adjusted positions by means of set screws 124.

In order to prevent any possibility of the stop-pins not being returned by the springs 32 after the keys are released, I provide a positive means for pushing these keys down after they have been elevated, these means being actuated from the eccentric 83, the parts, however, being timed so that the pin is not depressed until after the flying arm 25 has been brought to a stop. The means for positively returning the pins after they have been raised, comprises a lever 125 pivoted at 126 to the flying arm 92, in such position that one end of the lever will overlie the pin which has been lifted, and the other end of the lever will be directly in line with the axis about which the flying lever 92 rotates, a lever 127 pivotally mounted on the frame at 128 and having one end in line with the axis of the flying lever 92, and directly beneath one end of the lever 125 in position to actuate it, a link 129 pivotally connected at 130 to the lever 127 and a rock-arm 131 (Fig. 4) secured on the shaft 79 and pivotally connected at 132 with the link 129.

Figure 2:
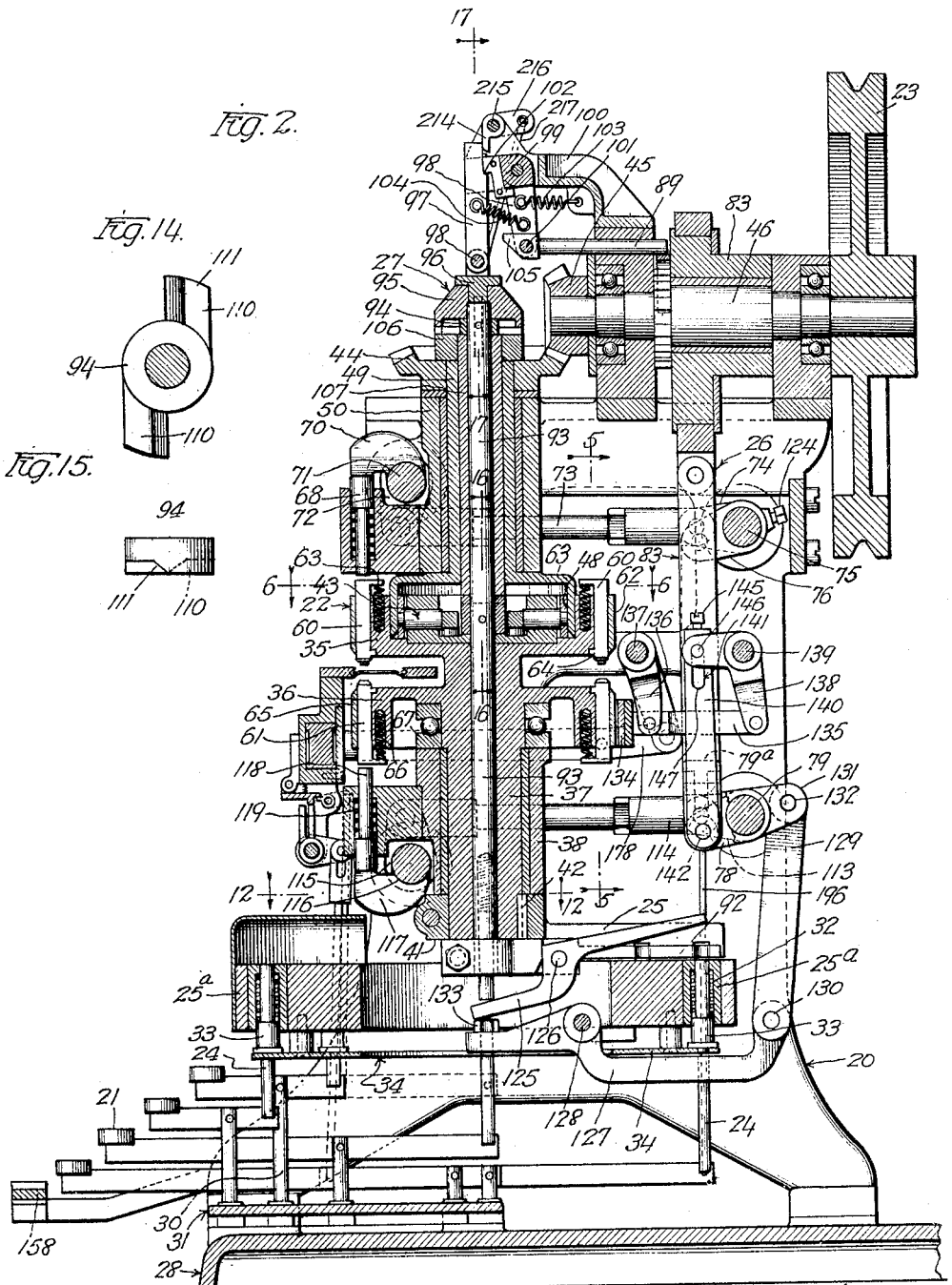
Fig. 2 is a vertical axial section on the line 2—2 of Fig. 1.

As one end of each of the levers 125 and 127 is in line with the axis about which the flying lever 92 rotates, it follows that this end of the lever 127 will always be directly underneath the end of the lever 125 no matter in what position the flying arm 92 is brought to rest. A bearing nut 133 may be provided on the end of the lever 127 to engage the end of the lever 125 (Fig. 2).

When one of the stop-pins 24 is raised into the path of the flying lever 92, this lever is brought to a stop, the other flying lever 25, however, continuing to move until it is brought up against the rear edge of the lever 92. This releases the clutch and causes the eccentric to make a single revolution, causing the selected die and matrix to be actuated, and in so doing causing an oscillation of the rock-shaft 79. This oscillation of the rock-shaft 79 causes a corresponding oscillation of the stop-pin depressing lever 125, through the rock-arm 131, the link 129, and the lever 127 to return the stop-pin which has been raised.

This returning of the stop-pin must, with the construction shown, take place before the die and matrix have completed their operation, and it is therefore necessary that other means be provided for holding the die-carrying wheel 22 from rotation after the stop-pin is moved out of the way of the flying arm 92. For this purpose I provide a friction brake, which comes into operation almost immediately after the eccentric 83 starts to move, to hold the die-carrying wheel 22 from rotation, and which brake is released just before the eccentric 83 completes its revolution, at which time the selected die and matrix will have completed their work on the blank and returned to practically their extreme open positions. This brake mechanism comprises a brake shoe 134 positioned to bear on the edge of the matrix-carrying wheel 36, a crooked link 135, to which the brake shoe 134 is secured, a rock-arm 136 pivotally connected with the link 135 for supporting the latter, a rock-shaft 137 on which the rock-arm 136 is secured, a bell crank lever 138, one end of which is pivotally connected with the link 135, a rock-shaft 139 on which the bell crank lever 138 is secured, and a link 140, having a lost motion connection at 141 with the bell crank lever 138, and having a pivotal connection at 142 with the rock-arm 78. When the brake is in operative position, it is held against the matrix-carrying wheel 36 by means of a coil torsion spring 143 (Fig. 4) which surrounds the rock-shaft 139 and has one end secured thereto, the other end being secured to the side frame of the machine at 144.

The parts for the operating mechanism for the brake are so proportioned that when the eccentric 83 is in its position of rest, the brake will be held just out of contact with the matrix-carrying wheel 36. However, as soon as the eccentric 83 is released and starts to rotate, the link 140 is raised, and this permits the coil torsion spring 143 to throw the brake against the matrix-carrying wheel. As the eccentric continues to rotate, the link 140 will continue to be raised, but this will have no further effect on the brake-shoe, because of the lost motion connection at 141. The brake will stay in its "on" position, until just before the eccentric 83 completes its movement, when the link 140 which is moving downward at this time, will begin to act on the rock-arm 138 and will on the final movement of the eccentric 83 move the brake-shoe 134 out of effective engagement with the matrix-carrying wheel 36. The lost motion connection between the bell crank lever 138 and the link 140 may be adjusted by means of a set screw 145, which is threaded into the end of the link 140 and the end of which set screw bears on a pin 146 secured to one end of the bell crank lever 138 and operating in the slot 147 of the link 140. This friction brake also serves to stop the die-carrying wheel in case the flying-arm 92 should accidentally slip out of engagement with a stop-pin 24 which had been elevated. It might happen that a stop-pin would be elevated enough to catch the flying-arm 92, and hold it long enough to start the die-operating mechanism, but this flying-arm 92 might accidentally get free from the stop-pin before the flying-arm 25 stops to definitely position the die-carrying wheel. In case of such an accident, were it not for the friction brake, the die-carrying wheel would continue to revolve and the die-actuating mechanism would operate. This would probably result in injury to the machine, as the die-operating mechanism would engage the dies while they were still rotating, which would in all probability injure the mechanism. However, the brake prevents such an action, as it would engage and stop the flying die-carrying wheel in the event that the flying-arm 92 should accidentally get free from the stop-pin, after it had started the die-operating mechanism in operation, and before the arm 25 stops to definitely position the die-carrying wheel. Of course, it might be that the die-carrying wheel would not be stopped by the friction brake in the desired position, but it would at least prevent injury to the machine, even if the wrong character were embossed, it could easily be blanked out and corrected.

When the drive pulley 23 is running and none of the stop-pins are raised, both of the flying arms 25 and 92 will be revolving, and the flying arm 92 will be kept a definite distance in advance of the flying arm 25 by means of the coil compression spring 148, one end of which bears on the flying arm 92 and the other end of which bears on the flying arm 25. A stop-pin 149 (Figs. 3, 12 and 13) secured on the hub of the flying arm 25 limits the distance between the arms 25 and 92 by engaging a portion of the flying arm 92. The arm 25 is provided with downwardly extending portions 150, which engage the rear face of the flying arm 92 when the arm 92 is brought to a stop by means of one of the stop-pins.

These downwardly extending projections are spaced apart to provide clearance for the stop-pins. This is necessary in the event that a stop-pin should be raised after the flying-arm 92 had passed, but before the flying arm 25 had reached this pin. If it were not for the clearance between the projections 150, the flying arm 25 would engage the raised stop-pin, which would stop the flying arm and consequently the die-carrying wheel, but the dies would not be actuated as the flying lever 92 which controls the operation of the dies would have passed the stop-pin without being detained, and hence there would be no relative movement between the cam members 94 and 95 and hence no shifting of the clutch or movement of the eccentric. However, as the projections 150 are spaced to provide clearance for the stop-pins, if a stop-pin should be raised after the flying-arm 92 had passed, and before the flying-arm 25 had reached the pin, both arms would continue to rotate for another revolution, when the flying arms 92 and 25 would both be stopped by the stop-pin, and the die-carrying wheel would be stopped and the selected die and matrix operated.

I will now describe the blank supporting carriage and associated parts (Figs. 4 and 5). The carriage 151 itself is mounted for transverse sliding movement on a guide-bar 152 which extends across the front of the machine, this guide-bar 152 itself being mounted for sliding fore and aft movement by means of a pair of slides 153, which extend rearwardly from the bar 152, and are slidable in guides 154, in the side frames of the machine. A spring drum 155 is provided for giving the carriage 151 its transverse movement, and a hand-lever 156 is provided for giving the transverse guide 152 its fore and aft movement.

In order to release the carriage 151 for a step-by-step movement in a transverse direction on the slide 152, an escapement mechanism 157 is provided, which is automatically controlled to permit the carriage to advance a step on each actuation of the die-operating mechanism and which is also manually controllable to permit a step-by-step movement of the carriage without any actuation of the dies, so that the embossing on the plate can be properly spaced and positioned. This manual control is effected by means of the space-bar 158 (Figs. 2 and 3) which extends transversely in front of the keys 21. A back space mechanism 159 is provided whereby the carriage 151 can be moved backward step-by-step when desired for making corrections, etc. A blanking key 160 is provided for flattening out a previously embossed portion, in case the wrong character is impressed on the plate. This blanking mechanism simply causes the actuation of two blank faced dies which straighten out the plate when the dies close together on the plate. A release mechanism 161 is also provided for completely releasing the sliding carriage 151 from the control of the escapement mechanism 157 to permit the sliding carriage to move freely under the action of the spring drum 155 the full travel if desired. A hand-lever 162 is provided for opening the jaws of the sliding carriage, to facilitate the insertion and removal of the blank.

The carriage 151 comprises a channel portion 163 (Fig. 9) which embraces the guide-bar 152 and is held in place on this guide-bar by means of a retaining plate 164. A fixed jaw 165 is secured to the channel block 163 which jaw cooperates with a movable jaw 166 pivoted at 167 to the channel block. These jaws are provided with opposed channels 167ª in their inner edges into which the blanks to be embossed are slipped.

The lever 162 which is used to move the movable jaw 166 is pivoted to the movable jaw at 168, and is provided with a cam slot 169 which cooperates with a pin 170, which is threaded into a boss 171 on the channel block 163.

When the lever 162 is pulled out from the position shown in Fig. 4, it will open the jaws because of the interengagement of the screw 170 with the cam slot 169, the direction of this cam slot being such that it will force the lever 162 to the left as it moves outwardly, consequently opening the jaw 166 about the pivot 167. A leaf spring 172 is provided for holding the pivoted jaw 166 in its closed position, this leaf spring being secured to the channel block 163 and having its end engaging the outer end of the pivoted jaw at 173.

The carriage 151 is attached to the spring drum 155 by means of a flexible metal ribbon 174, which is wrapped around the spring drum 155 as it rotates.

The spring drum 155 comprises a casing 175 rotatably mounted on a shaft 176 secured to the guide 152, and a coil torsion spring 177 enclosed in the housing 175 and having one end secured to said housing and the other end secured to the shaft 176.

The slides 153 on which the transversely-extending guide 152 is mounted for fore and aft movement are connected to be operated by the hand lever 156 by means of a pair of links 178, a pair of rock-arms 179 pivotally connected with the links 178 respectively, asd the rock-shaft 137 to which the rock-arms 179 are secured, and to which the handle 156 also is secured. By moving the hand-lever 156 up or down the transversely-extending guide 152 on which the carriage 151 slides is moved forward and back.

In order to properly space the lines of embossing on the plate, a spring pressed detent 180 is provided (Fig. 4) which engages in any one of a plurality of notches 181 in one of the slides 153 to definitely position these slides when they are adjusted by means of the handle 156. The spacing of these notches 181 is such that when the detent 180 engages these notches the plate or blank will be in proper position to receive the impression. A coil compression spring 182 is provided for pressing the detent 180 into the notches 181, this compression spring being held in a cap 183 secured to the side frame of the machine.

The escapement mechanism 157 comprises a rack 184 secured to the transversely-sliding channel block 163, a pair of pawls or detents 185 and 186, and a rock-shaft 187, to which both of the detents 185 and 186 are secured, this rock-shaft being oscillatably mounted in bearing brackets 188, located at opposite sides of the machine. The oscillating movement of this rock-shaft 187 is limited by means of a collar 189 (Fig. 8) secured to the end of the rock-shaft 187, this collar having an extension 190, the shoulders of which engage the shoulders of a cooperating extension 191, on one of the bearing brackets 188.

The rock-shaft 187 is automatically oscillated at each revolution of the eccentric 83 (and consequently at each operation of the dies) by a suitable transmission mechanism 192, which will be hereinafter described in detail. The rock-shaft 187 can also be oscillated manually from the spacer bar 158 as will be hereinafter described in detail. The pawls or detents 185 and 186 are located out of alignment with each other as shown in Fig. 9, so that when one of the detents is in line with the teeth on the rack 184, the other detent is out of alignment with said rack. If now the rock-shaft 187 is oscillated, the detents 185 and 186 are oscillated with it. Assuming that the parts are as shown in Fig. 9 and that the rock-shaft 187 is oscillated, the detent 186 will be moved away from engagement with the tooth of the rack 184 which it is holding, but before the detent is out of engagement with the tooth the detent 185 will have been moved in front of one of the teeth of the rack, consequently when the tooth of the rack 184 slips off from engagement with the detent 186 (permitting the carriage 151 to be shifted by means of the spring drum 155), this movement of the carriage 151 will be arrested by the engagement of one of the teeth of the rack 184 with the detent 185, which has been moved over in alignment with the teeth of the rack. On the return movement of the rock-shaft 187 the detent 185 will move out of engagement with the rack tooth with which it is engaged, but before this disengagement takes place, the detent 186 will have been moved over into alignment with the teeth of the rack, so that when the rack slips off from the tooth 185, it will move only until one of the teeth of the rack is caught by the detent 186. Thus each complete oscillation back and forth of the rock-shaft 187, will permit the carriage 151 to advance a distance equal to the space between two adjacent teeth of the rack 184. This advance of the carriage 151 will move the blank into position to receive the next impression from the dies.

The transmission mechanism 192 (Fig. 8) for automatically oscillating the rock-shaft 187 comprises a rock-arm 193 secured to the rock-shaft 187, a vertically extending link 194 having a lost motion connection with the rock-arm 193, a horizontally extending lever 195 (Figs. 1 and 3) pivotally connected with the link 194, a vertically extending link 196 (Figs. 4 and 6) pivotally connected with the horizontally extending lever 195, and a rock-arm 197 adjustably secured on the rock-shaft 79. As the rock-shaft 79 oscillates every time the dies are operated, the rock-shaft 187 which carries the detents 185 and 186 will also be oscillated each time the dies are actuated. By adjusting the rock-arm 197 about its rock-shaft 79, the throw of the detents 185 and 186 may be properly adjusted so that they will have the proper relative position with respect to the rack 184.

A lost motion connection is provided between the rock-arm 193 and the vertically extending link 194 in order that the automatic control of the detents 185 and 186 may not interfere with the manual control, that is, in order that the controls may be exerted independently of each other, as will be described later in detail.

In order to return the rock-shaft 187 after it has been oscillated by the link 194 just described, a coil torsion spring 198 is provided, one end of which is secured to the bracket 188 and the other end of which is secured to a rock-arm 199, which is secured on the rock-shaft 187.

This rock-arm 199 forms a part of the manual means for controlling the oscillation of the rock-shaft 187, this mechanism comprising in addition a second rock-arm 200, also secured to the rock-shaft 187, and a pair of vertically extending links 201, each having a lost motion connection with the rock-arms 199 and 200 respectively, the other ends of these vertically extending links 201 being pivotally connected with the spacer-bar levers 202 respectively. (Fig. 3.)

Because of the lost motion connection between the rock-arms 193, 199, 200 and their respective vertically extending operating links 194 and 201, the automatic control of the rock-shaft 187 is not interfered with by the manual control of the rock-shaft by the spacer-bar and vice-versa.

A depression of the spacer-bar 158 will move the detent 186 out of engagement with the teeth of the rack 184, permitting the carriage 151 to move over until it is held by the detent 185. When the spacer-bar is released the rock-shaft 187 will be returned by means of the spring 198, which will cause the detent 185 to move out of engagement with the teeth of the rack 184, and the detent 186 to move into alignment with the teeth of said rack, permitting the carriage 151 to move over again until the rack bar is held by engagement with the detent 186.

The back-spacing mechanism 159 comprises a reciprocable and oscillatable pusher or pawl 203, (Figs. 8 and 11) which is oscillatable to bring in into and out of alignment with respect to the teeth of the rack 184, and which is reciprocable to enable it when engaged with the teeth of this rack to move the rack longitudinally to the right (Fig. 8).

As shown in Fig. 8 this pusher or pawl 203 extends upwardly considerably further than the detent 185 and 186, and as shown in Figs. 8, 9 and 11, the rack 184 is pivotally secured at 204 to the channel block 163 of the carriage 151. The purpose of making the pusher 203 extend above the detents 185 and 186 and of making the rack 184 tiltable on the carriage, is in order that when the pusher 203 is actuated to shove the rack 184 to the right, the rack can tilt upwardly and ride over the detent 186 which is engaged with the teeth of the rack, and so that in sliding over this detent the rack will not become disengaged from the pusher 203. The purpose of making the pusher 203 oscillatable is so that it may normally be out of alignment with the teeth of the rack 184, so as not to interfere with its movement, but so that when it is desired to back space it can be moved over into alignment with the teeth of this rack.

The transmission mechanism for connecting the pusher 203 with the back spacer key 159, comprises a combined cam and lever member 204, pivoted at 205 on the slide member 206 which carries the pusher 203, and a vertically extending link 207, pivotally connected with the member 204 at its upper end, and pivotally connected at its lower end with the back spacer key. The slide 206 is mounted to reciprocate on the rock-shaft 187 and is normally pressed to the left as shown in Fig. 8 by means of a coil compression spring 208, one end of which bears on the hub of the detent 186 and the other end of which bears on the slide 206. The tension in this spring 208 is such as to normally hold the slide 206 to the left as shown in Fig. 8. For normally holding the pusher 203 out of alignment with the teeth of the rack 184 as shown in Fig. 11, a coil compression spring 208$^a$ (Fig. 10) is provided, one end of which bears on an arm 208$^b$ secured to the slide 206. This distance to which the slide 206 can be pushed to the left by means of the spring 208 is limited by the engagement of this slide 206 with the hub of the rock-arm 200. The distance to which this slide 206 can be oscillated by the action of the spring 208$^a$ is limited by the engagement of an extension 209 (Figs. 8 and 10) of the member 204, with a bracket 210 secured to the transversely extending guide 152. This bracket 210 also serves as a fulcrum which is engaged by the cam portion 211 of the member 204.

When the back-spacer key 159 is depressed, to pull down on the link 201, the first effect on the pusher 203 is to oscillate it about the axis of the rock-shaft 187 to bring the pusher 203 into alignment with the teeth of the rack 184. A further movement of the link 201 will cause the cam portion 211 to bear against the bracket 210 which will cause the slide 206 to be shifted to the right as shown in Fig. 8. This will push the rack 184 to the right, the rack 184 tilting to slide over the top of the detent 186. When the pusher 203 has been moved to its extreme right hand position and the back space key 159 is released, the compression spring 208 will force the pusher again to the left. As the pusher 203 moves to the left it rides under the teeth of the rack 184 without raising the latter, as it is pivoted at 212 to the slide 206 and tilts about this pivotal point as it rides back under the teeth of the rack. The rack is prevented from returning along with the pusher by means of its engagement with the detent 186. A spring 213 is provided for normally holding the pusher 203 in its raised position to engage the teeth of the rack when moving to the right. (See Fig. 8.)

In order that the release mechanism 161 may operate to release the sliding carriage from the control of the escapement mechanism 157 to permit the sliding carriage to move freely under the action of the spring drum 155, its full travel, if desired, the rack 184 is mounted on pivots 213ᵃ (Figs. 8 and 9) so that it can be swung upwardly out of the way of the pawls 185 and 186 by means of a lift finger 213ᵇ secured on a rock-shaft 213ᶜ, this rock-shaft being oscillatable, from the release key 213ᵈ by means of a link 213ᵉ pivotally connected with the release key 213ᵈ (Fig. 3) and also pivotally connected with a rock arm 213ᶠ secured to the rock shaft 213ᶜ. A coil compression spring 213ᵍ is provided for insuring that the rack 184 shall be normally in operative relation with respect to the detents 185 and 186.

Figure 1:
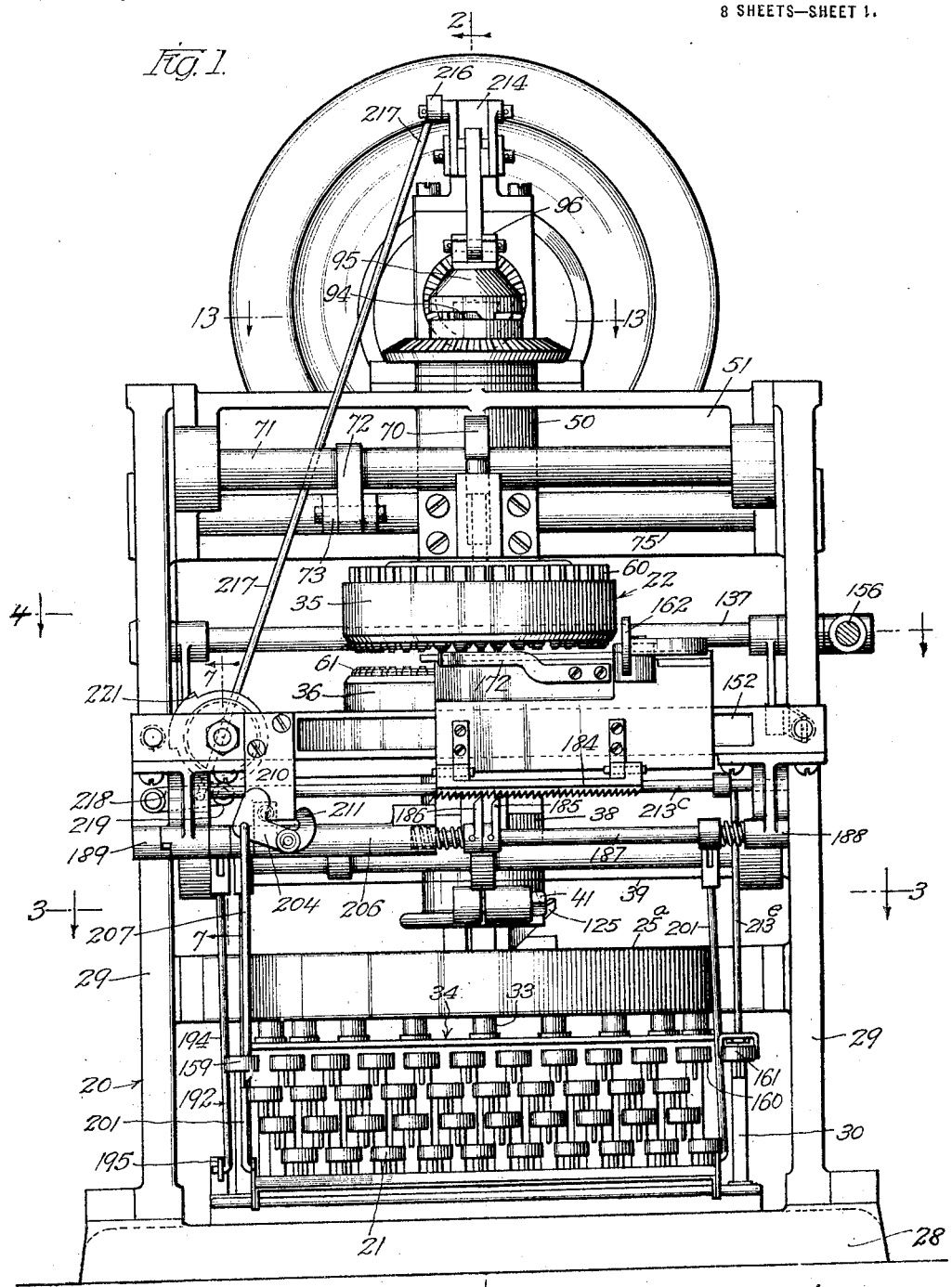
Fig. 1 is a front elevation of a key-board typograph embodying my invention.

As previously stated means are provided whereby when the carriage has moved to its extreme left position as shown in Figs. 1 and 4, the depression of a key will not cause actuation of the dies. This mechanism comprises a kick-off arm 214 (Fig. 2) located at the upper central part of the machine, positioned to engage the pivoted link 97, to disengage it from operative relation with respect to the rock-arm 99. This kick-off member 214 is secured to a rock-shaft 215, which is actuated from the spring drum 155 which moves the carriage. The mechanism for actuating this rock-shaft 215 from the spring drum comprises a rock-arm 216 secured to the rock-shaft 215, a link 217 pivotally connected with the rock-arm 216, and a combined cam and lever member 218 (Figs. 1 and 7) to which the link 217 is pivotally connected and which has a roller 219 in position to be engaged by a cam collar 220 secured on the spring drum housing 175.

As the blank carriage moves to the left, and the spring drum 155 rotates, the shoulder 221 (Fig. 1) on the cam member 220 engages the roller 219 and moves it downwardly, thus pulling down on the link 217 and on the rock-arm 216 to cause the kick-off member 214 to push the link 97 out of operative engagement with respect to the bell crank lever 99. As this makes it impossible for the pin 89 to be withdrawn by the actuation of the keys 21, the actuation of these keys will not cause any embossing operation of the dies.

The operation of the various parts of the machine has been described in connection with the description of the construction. However, I will now sum up briefly the operation of the machine. Power is applied to the belt pulley 23 to rotate it continuously. This causes the die-carrying wheel and the two flying arms 25 and 92 also to be normally continuously rotated, through the friction drive 43. A plate to be embossed is now placed in the carriage 151 and this carriage is moved to the right hand position by pushing on lever 162 (which also automatically tightens the jaws on the blank) and is also moved forward by means of the hand-lever 156. This brings the plate into the proper position to receive the first character to be embossed. The keys are then depressed, one after the other, to cause the desired characters to be embossed on the plate, the carriage 151 being automatically advanced step-by-step as each character is embossed, until the end of the line is reached. The carriage is then returned to the right hand position, and the lever 156 operated to bring the plate into proper position for the embossing of the next line. This operation is repeated until the desired embossing has been placed on the plate.

If it is desired to cause the blank to advance a step without any embossing operation, the space-bar 158 is operated, which automatically lets the carriage advance without any embossing operation. If the wrong character is embossed, the carriage may be back-spaced by the back-spacer key 159, and the blank key 160 operated to flatten out the embossing, and to put the blank in shape to receive the right character.

If it is desired to move the carriage to the left a substantial distance, or more than a single step, without any embossing operation, the release lever 161 is operated which lifts the rack 184 away from the detents 185 and 186 to permit the carriage to be moved to the left any desired distance.

Having thus described my invention, what I claim as new and desire to secure by Letters Patent of the United States, is:

1. An embossing machine comprising a rotatable die-carrying wheel, a series of dies carried by said wheel, a plurality of stops for selectively stopping said die-carrying wheel in any selected position, means whereby when said die-carrying wheel is stopped by one of said stops, one of said dies will be operated, means for returning said stop, a friction brake for holding said die-carrying wheel after said stop has been returned, and means for applying said brake before said stop is returned.

2. An embossing machine comprising a rotatable die-carrying wheel, a plurality of dies carried thereby, a plurality of stops for stopping said die-carrying wheel in any selected position, means comprising an eccentric for operating one of said dies when said die-carrying wheel is stopped by one of said stops, means for returning said stop, and a friction brake for holding said die-carrying wheel after said stop is returned, said brake being controlled by said eccentric.

3. An embossing machine comprising a rotatable die-carrying wheel, a plurality of dies carried thereby, a plurality of stops for stopping said die-carrying wheel in any selected position, means for operating one of said dies when one of said stops stops said die-carrying wheel, means for returning said stop, and a friction brake for holding said die-carrying wheel after the stop has been returned, said friction brake being controlled by said die-operating means.

4. An embossing machine comprising a rotatable die-carrying wheel, a plurality of dies carried thereby, a plurality of stops for stopping said die-carrying wheel in any selected position, means for operating one of said dies when one of said stops stops said die-carrying wheel, means for returning said stop, a brake for holding said die-carrying wheel after said stop has been returned, a spring tending to force said brake into holding position, and means whereby said operating means controls said brake to allow said spring to move it into holding position, and afterwards to move said brake out of holding position.

5. An embossing machine comprising a rotatable die-carrying wheel, a plurality of dies carried thereby, a plurality of stops for stopping said die-carrying wheel in any selected position, means whereby one of said dies will be operated when said die-carrying wheel is stopped by one of said stops, means for returning said stop, and a brake for holding said die-carrying wheel after said stop has been returned, said brake acting on the periphery of said die-carrying wheel.

6. An embossing machine comprising upper and lower die-carrying wheels rotatable about a vertical axis, two series of cooperating dies carried by said wheels respectively, a brake-shoe carrier secured to said die-carrying wheel to rotate therewith about the same axis, a radially movable spring pressed brake-shoe carried by said brake-shoe carrier, a brake-drum enclosing said brake-shoe carrier and brake-shoe, against the inner surface of which said brake-shoes bear, a bevel-gear secured to said brake-drum, to rotate therewith about the same axis, a second bevel-gear meshing with said first bevel-gear, a horizontal shaft on which said second bevel-gear is secured, a drive pulley secured to said horizontal shaft, an eccentric surrounding said shaft, an eccentric-strap surrounding said eccentric, transmission means from said eccentric to said dies, a clutch between said drive pulley and said eccentric, a series of key operated stop-pins arranged about the axis of said die-carrying wheel, a lever revolving about the axis of said die-carrying wheel in position to be engaged by said stop-pins and a connection from said lever to said clutch whereby said lever controls said clutch, said connection comprising a shaft extending through said brake-carrier and brake-drum and through the hub of said first bevel-gear, said shaft being actuated by said lever, said shaft being in alignment with the axis of said die-carrying wheel.

7. An embossing machine comprising a rotatable die-carrying wheel, a series of dies carried thereby, an arm rotatable with said die-carrying wheel, a plurality of stops for selectively engaging said arm, to stop said die-carrying wheel in any selected position, and means carried by said rotatable arm for returning a stop member after it has been actuated.

8. An embossing machine comprising a rotatable die-carrying wheel, a series of dies carried thereby, an arm rotatable with said die-carrying wheel, a plurality of manually-operable stops for stopping said arm in any selected position, and means comprising a pivoted lever carried by said arm for returning the stop member which has been actuated.

9. An embossing machine comprising a rotatable die-carrying wheel, a series of dies carried thereby, an arm rotatable with said die-carrying wheel, a plurality of manually-operable stops for stopping said arm in any selected position, and means comprising a pivoted lever carried by said arm for returning the stop member which has been actuated, said pivoted lever having one end in alignment with the axis of said die-carrying wheel.

10. An embossing machine comprising a rotatable die-carrying wheel, manually-operable selective means for positively stopping said die-carrying wheel, in any one of a plurality of desired positions, a series of dies carried by said wheel, means for operating said dies, means for returning said positive stop means and means for holding said die-carrying wheel from rotation as the said positive stop means have been returned, comprising a friction brake.

11. An embossing machine comprising a rotatable die-carrying wheel, manually-operable selective means for positively stopping said die-carrying wheel, in any one of a plurality of desired positions, a series of dies carried by said wheel, means for operating said dies, means for returning said positive stop means and means for holding said die-carrying wheel from rotation as the said positive stop means have been returned, comprising a friction brake, and means whereby said brake mechanism becomes effective to hold the die-carrying wheel from rotation immediately after the die-operating mechanism starts to operate, and remains effective until immediately before the die-operating mechanism has completed its operation.

12. An embossing machine comprising a rotatable die-carrying wheel, a series of dies carried thereby, manually-operable selective means for positively stopping said die-carrying wheel in any one of a plurality of positions, means whereby on stopping said die-carrying wheel, said dies will be operated, means for returning said positive stopping means, a brake for frictionally holding said die-carrying wheel from rotation after said positive means have been returned, a spring for holding said brake in operative position, means for normally holding said brake in inoperative position against the tension of said spring, and means put in operation by the stopping of said die-carrying wheel for actuating said holding means to allow the brake to move to operative position under the action of said spring.

13. An embossing machine comprising a rotatable die-carrying wheel, a series of dies carried thereby, manually-operable selective means for positively stopping said die-carrying wheel in any one of a plurality of positions, means whereby on stopping said die-carrying wheel, said dies will be operated, means for returning said positive stopping means, a brake for frictionally holding said die-carrying wheel from rotation after said positive means have been returned, a spring for holding said brake in operative position, means for normally holding said brake in inoperative position against the tension of said spring, and means put in operation by the stopping of said die-carrying wheel for actuating said holding means to allow the brake to move to operative position under the action of said spring, means for operating said dies put in operation upon the stopping of said die-carrying wheel whereby said holding means are operated to permit the brake to move to operative position almost immediately after said die-operating means are put in operation and for moving said holding means to move the brake out of operative position against the tension of said spring just before the die-operating means have completed their operation.

14. An embossing machine comprising a rotatable die-carrying wheel, a series of dies carried thereby, and means for operating said dies comprising a drive shaft, a rock-shaft, a rock-arm secured to said rock-shaft for actuating the dies, and transmission means between said rock-shaft and drive shaft comprising a link, and means whereby the length of said link may be adjusted to change the movement of said dies.

15. An embossing machine comprising a pair of opposed die-carrying wheels, opposed dies carried by said die-carrying wheels, and means for operating said dies, comprising a pair of rock-shafts, one for each die-carrying wheel, rock-arms secured to said rock-shafts respectively, for actuating said dies respectively, and transmission means between said drive shaft and said rock-shaft comprising a pair of links, one for each rock-shaft and means whereby both of said links may be adjusted in length to change the throw of said dies.

16. An embossing machine comprising a die-carrying wheel rotatable about the vertical axis, a plurality of dies carried by said die-carrying wheel, and means for operating said dies comprising two rock-shafts, on opposite sides of the axis of said die-carrying wheel, rock-arms secured to said rock-shafts respectively, and a link connecting said rock-arms.

17. An embossing machine comprising a pair of opposed die-carrying wheels, opposed dies carried by said die-carrying wheels, and means for operating said dies, comprising two pairs of rock-shafts, the rock-shafts of each pair being located on opposite sides of the axis of said die-carrying wheel, rock-arms carried by said rock-shafts respectively, and two links, one connecting the rock-arms of each pair of rock-shafts.

18. An embossing machine comprising a pair of opposed die-carrying wheels, opposed dies carried by said die-carrying wheels, and means for operating said dies, comprising two pairs of rock-shafts, the rock-shafts of each pair being located on opposite sides of the axis of said die-carrying wheel, rock-arms carried by said rock-shafts respectively, and two links, one connecting the rock-arms of each pair of rock-shafts, and an eccentric for operating said rock-shaft.

19. An embossing machine comprising a rotatable die-carrying wheel, a plurality of dies carried thereby, transmission means for operating said dies, comprising a clutch, means for stopping said die-carrying wheel, transmission means between said stopping means and said clutch for controlling said clutch, and means for positively and automatically disconnecting said second transmission means from control of said clutch.

20. An embossing machine comprising a rotatable die-carrying wheel, a plurality of dies carried thereby, transmission means for operating said dies, comprising a clutch, means for stopping said die-carrying wheel, transmission means between said stopping means and said clutch for controlling said clutch, and means for positively and automatically disconnecting said second transmission means from control of said clutch, comprising two pivoted members having releasable engagement with each other, and means whereby movement of said first pivoted member, positively causes said pivoted members to disengage.

21. An embossing machine comprising a rotatable die carrying wheel; a plurality of dies carried thereby, and transmission means for operating said dies comprising a clutch, said clutch comprising a rotating ratchet, a rotatable member, a pawl pivoted to said rotatable member and movable into and out of engagement with said ratchet, and a stop member located in the path of said pawl, said pawl having a cam portion for engaging said stop member to lift said pawl out of engagement with said ratchet and a stop portion for engaging said stop member for stopping said pawl and said rotatable member.

22. An embossing machine comprising a die-carrying wheel, a plurality of dies carried by said die-carrying wheel, transmission means for operating said dies comprising a clutch, means for controlling said clutch comprising a pair of cooperating cam members, having relative rotation with respect to each other, said cam members being coaxial with said die-carrying wheel.

23. An embossing machine comprising a rotatable die-carrying wheel, a plurality of dies carried thereby, a movable blank-holding carriage, means for operating said dies and means controlled by said carriage for rendering said die-operating means inoperative.

24. An embossing machine comprising a rotatable die-carrying wheel, a plurality of dies carried thereby, a movable blank-holding carriage, transmission means including a clutch for operating said dies and means controlled by said carriage for controlling said clutch.

25. An embossing machine comprising a rotatable die-carrying wheel, a plurality of dies carried thereby, a plurality of stops for selectively stopping said die-carrying wheel in any selected position, a movable blank-holding carriage, transmission means for operating said dies comprising a clutch, transmission means between said stop means and said clutch for controlling said clutch, and means controlled by said carriage for disconnecting said second transmission means.

26. An embossing machine comprising a plurality of dies, means for operating said dies, a slidable carriage, a rack carried by said slidable carriage and an escapement for said rack comprising two pawls for alternatively engaging the teeth of said rack, said pawls being oscillatable about an axis parallel to the rack and having no movement longitudinally of the rack.

27. An embossing machine comprising a plurality of dies, means for operating said dies, a slidable carriage, means for applying force to give a step-by-step movement to said slidable carriage comprising a rack, and a pawl oscillatable about an axis parallel to the rack, into and out of alignment with the rack, and reciprocable in the direction of the rack to give the rack a step-by-step movement.

28. An embossing machine comprising a plurality of dies, means for operating said dies, a slidable carriage, a rack carried by said slidable carriage, means for controlling the movement of the carriage in one direction comprising a pawl, means for moving said carriage in the opposite direction comprising a reciprocable member, said rack being pivoted to swing over said pawl when it is actuated by said reciprocable member.

29. An embossing machine comprising a plurality of dies, means for operating said dies, a slidable carriage, a rack carried by said carriage, a pawl for engaging said rack, a rock-shaft on which said pawl is mounted and means for applying force to give said carriage a step-by-step movement comprising a member reciprocable and oscillatable on said rock-shaft.

30. An embossing machine comprising a plurality of dies, means for operating said dies, a slidable carriage, a rack carried by said carriage, a pawl for engaging said rack, and a reciprocable member for applying force to give said carriage a step-by-step movement, said reciprocable member being pivoted to allow it to ride under the teeth of said rack in one direction.

31. An embossing machine comprising a plurality of dies, means for operating said dies, a blank-holding carriage, comprising two jaws for holding the blanks, one of said jaws being movable and means for operating said movable jaw comprising a cam lever.

32. An embossing machine comprising a hollow die-carrying wheel, a plurality of dies carried by said wheel, and means for driving said die-carrying wheel comprising a friction drive member located inside said wheel.

33. An embossing machine comprising a hollow die-carrying wheel, a plurality of dies carried thereby, means for driving said die-carrying wheel comprising a cup-shaped member telescoping into said die-carrying wheel, and a friction shoe enclosed between said cup-shaped member and said die-carrying wheel, and secured to said die-carrying wheel and bearing on said cup-shaped member.

34. An embossing machine comprising a plurality of dies, means for operating said dies, a slidable blank-holding carriage, means for controlling the movement of said carriage, comprising a rack secured to said carriage, and a pawl for operating with said rack, said rack being pivotally mounted on said carriage, and means for moving said rack about its pivot to release said pawl.

35. An embossing machine comprising a carriage movable transversely of the machine, a blank holding jaw movable with said carriage for gripping the blanks, and means whereby moving said carriage transversely will cause said jaw to grip said blank.

36. An embossing machine comprising a carriage movable transversely of the machine, a pivoted blank holding jaw movable with said carriage for gripping the blank, and means whereby moving said carriage transversely will cause said jaw to move about its pivot to grip said blank.

37. An embossing machine comprising a carriage movable transversely of the machine, a blank holding jaw movable with said carriage for gripping the blanks, and means whereby moving said carriage transversely will cause said jaw to grip said blanks, said last means comprising a pivoted lever.

38. An embossing machine comprising a carriage movable transversely of the machine, a pivoted blank holding jaw movable with said carriage for gripping the blanks, and means whereby moving said carriage transversely will cause said jaw to grip said blanks, comprising a lever pivoted to said pivoted jaw.

39. An embossing machine comprising a carriage movable transversely of the machine, a blank holding jaw movable with said carriage for gripping the blanks, and common means for shifting said carriage transversely and moving said jaw to grip said blanks.

In witness whereof, I have hereunto subscribed my name.

CLARENCE E. STEERE.